United States Patent [19]

Jones

[11] Patent Number: 5,752,802
[45] Date of Patent: May 19, 1998

[54] SEALING APPARATUS FOR AIRFOILS OF GAS TURBINE ENGINES

[75] Inventor: Russell B. Jones, San Diego, Calif.

[73] Assignee: Solar Turbines Incorporated, San Diego, Calif.

[21] Appl. No.: 770,757

[22] Filed: Dec. 19, 1996

[51] Int. Cl.⁶ .................................................. F04D 29/08
[52] U.S. Cl. .............................. 415/170.1; 415/174.4; 277/53
[58] Field of Search ........................... 415/170.1, 173.1, 415/174.2, 174.4; 277/53

[56] References Cited

U.S. PATENT DOCUMENTS

| | | | |
|---|---|---|---|
| 4,526,509 | 7/1985 | Gay, Jr. et al. | 415/173.1 |
| 5,234,318 | 8/1993 | Brandon | 415/170.1 |
| 5,400,586 | 3/1995 | Bagepalli et al. | 277/53 |
| 5,522,602 | 6/1996 | Kaplo et al. | 277/53 |
| 5,599,026 | 2/1997 | Sanders et al. | 415/174.4 |
| 5,628,622 | 5/1997 | Thore et al. | 415/173.1 |

Primary Examiner—John T. Kwon
Attorney, Agent, or Firm—Larry G. Cain; O. Gordon Pence

[57] ABSTRACT

An improved airfoil tip sealing apparatus is disclosed wherein brush seals are attached to airfoil tips with the distal ends of the brush seal fibers sealingly contacting opposing wall surfaces. Embodiments for variable vanes, stators and both cooled and uncooled turbine blade applications are disclosed.

8 Claims, 6 Drawing Sheets

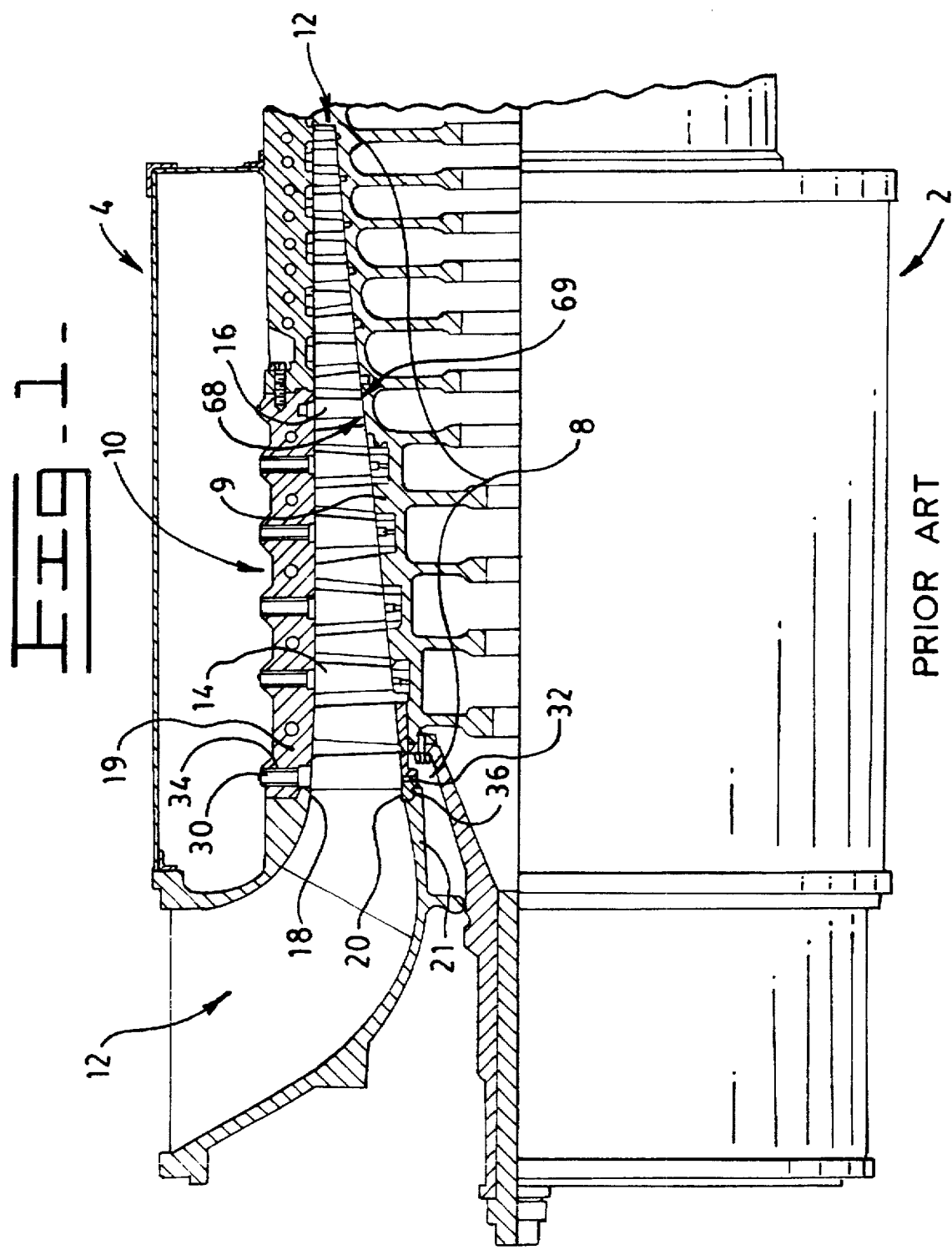
Fig. 1 — PRIOR ART

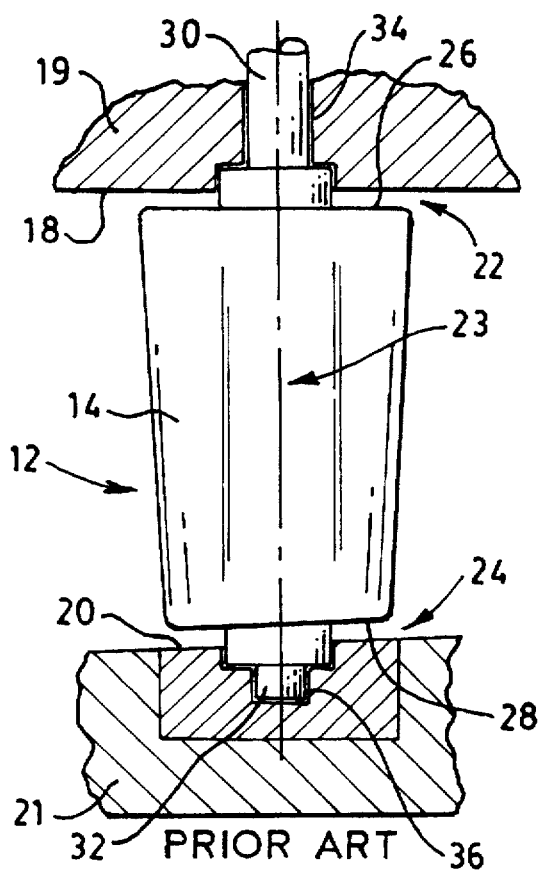
Fig_2_
PRIOR ART
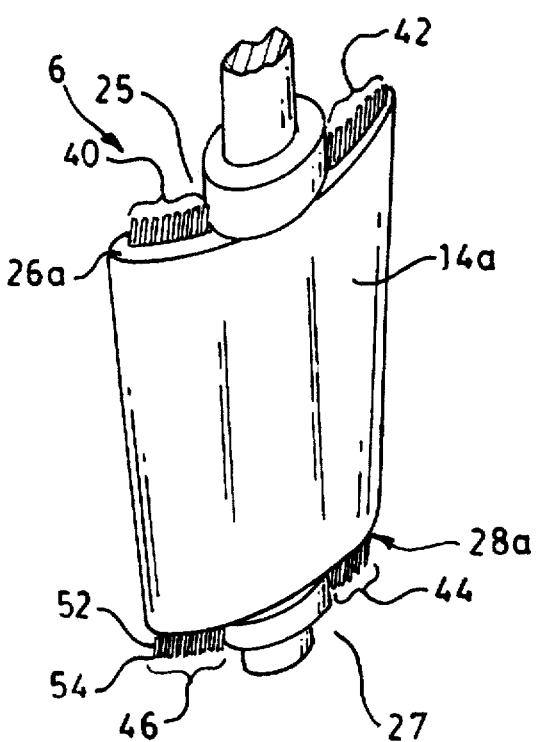
Fig_3_
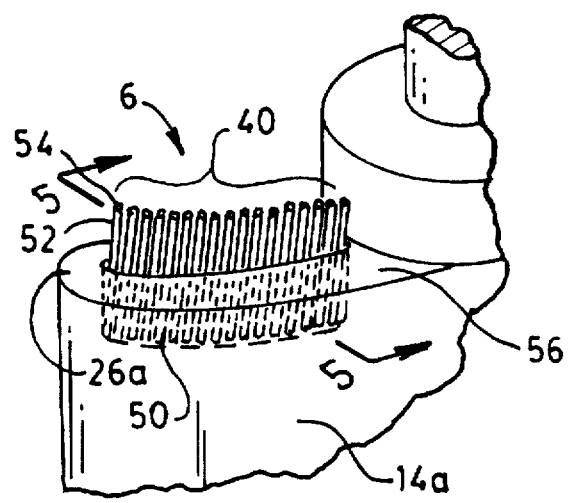
Fig_4_
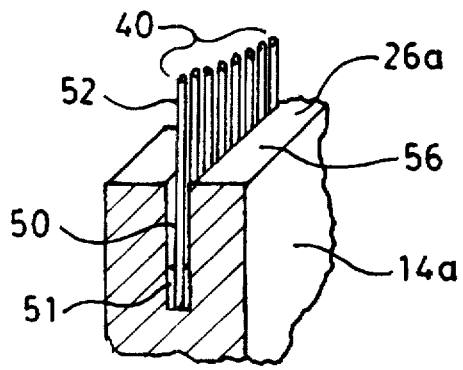
Fig_5_

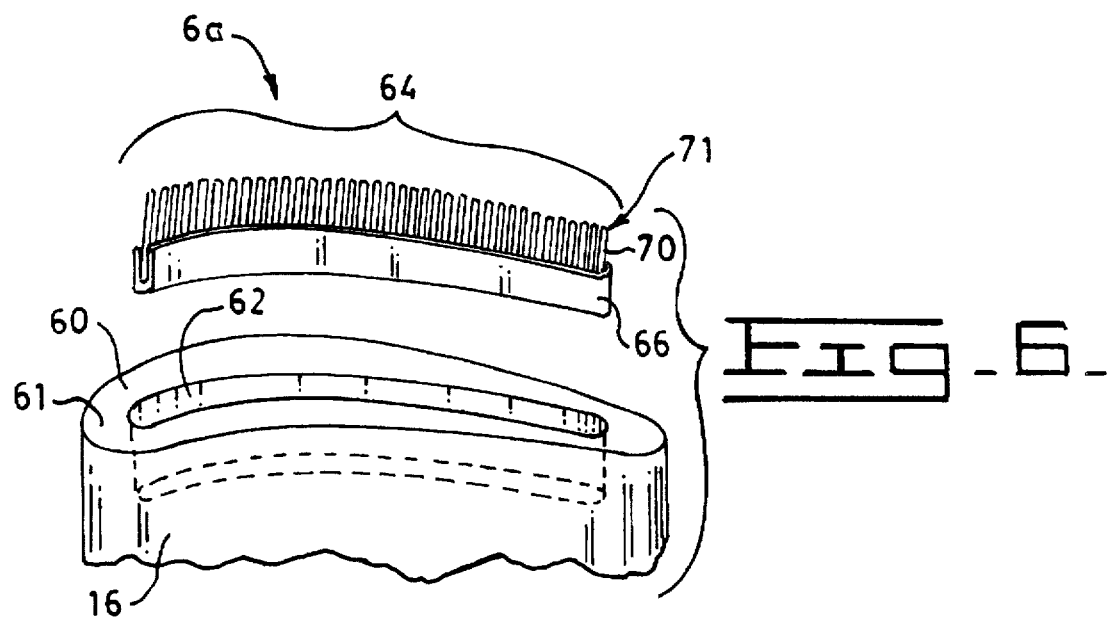
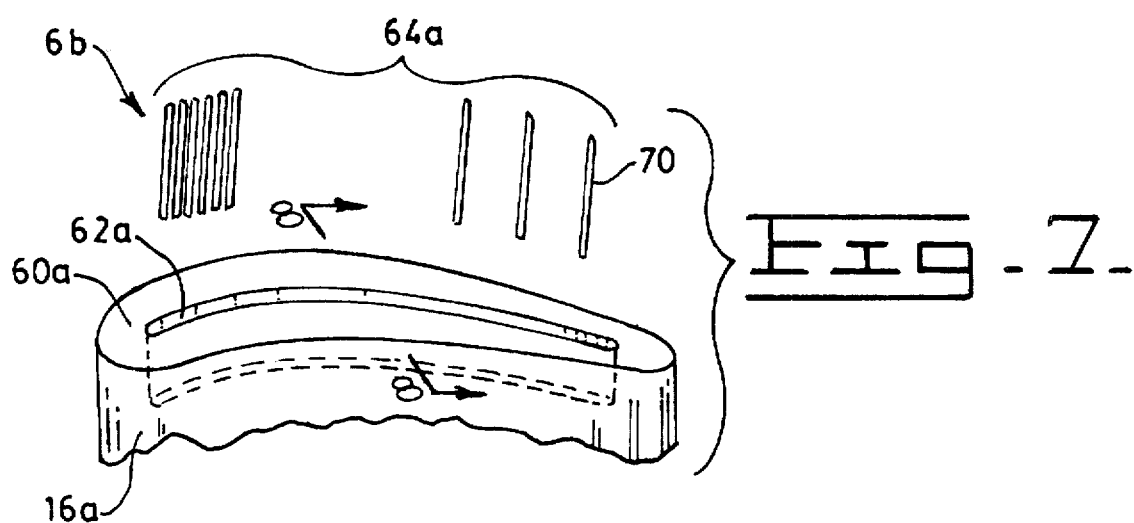
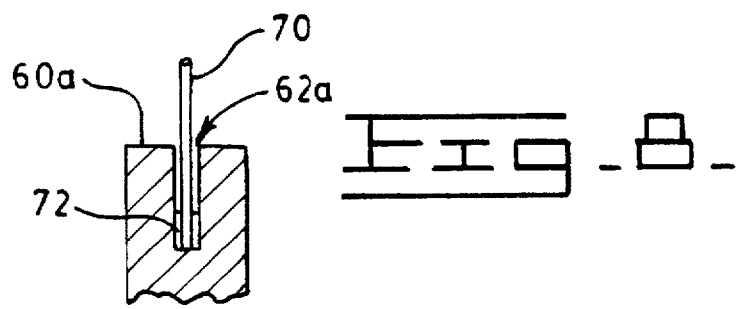

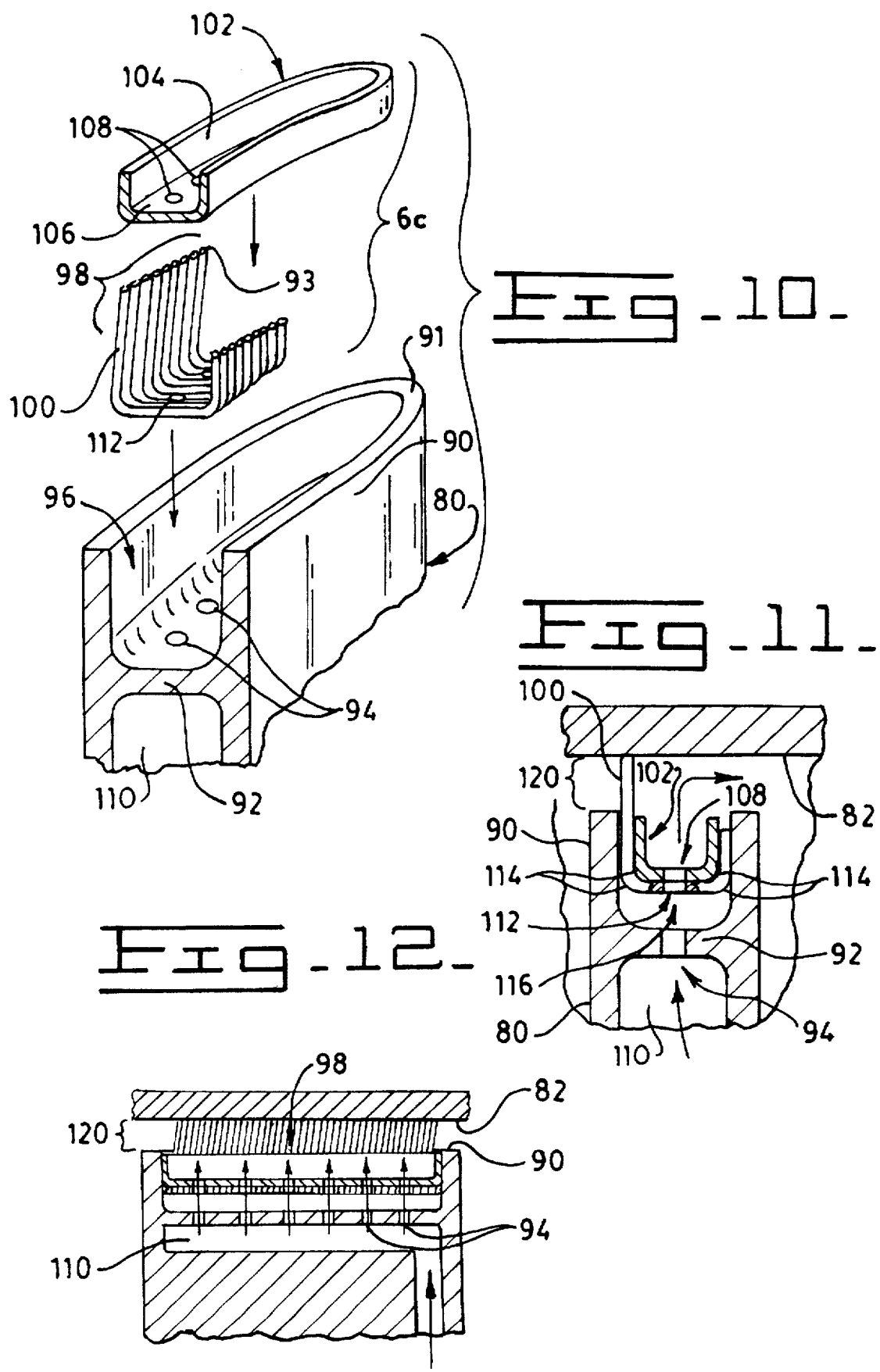

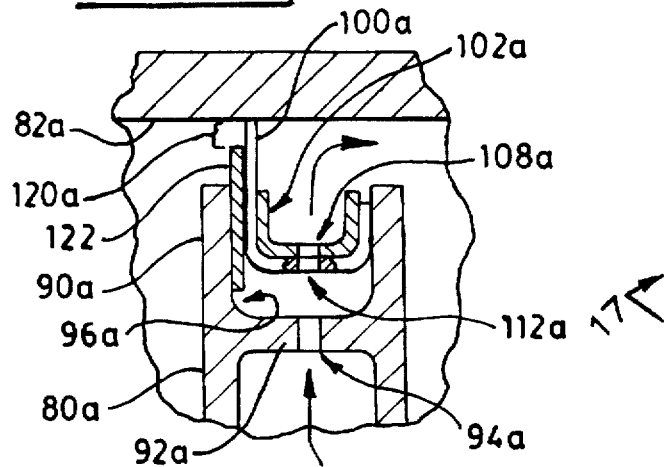
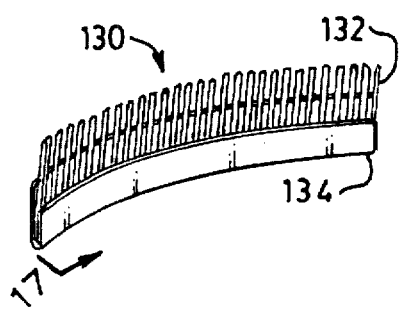
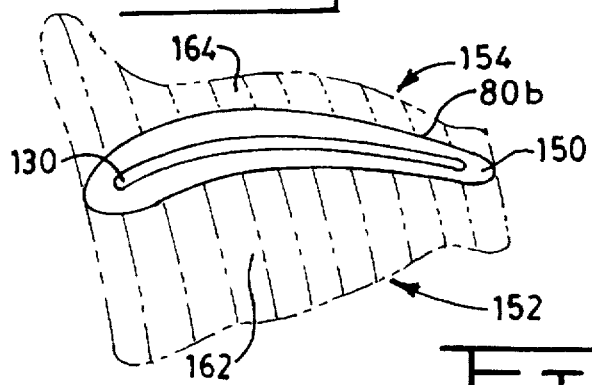
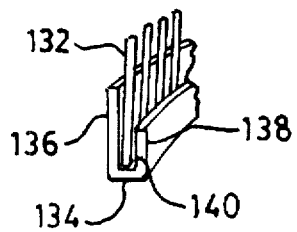
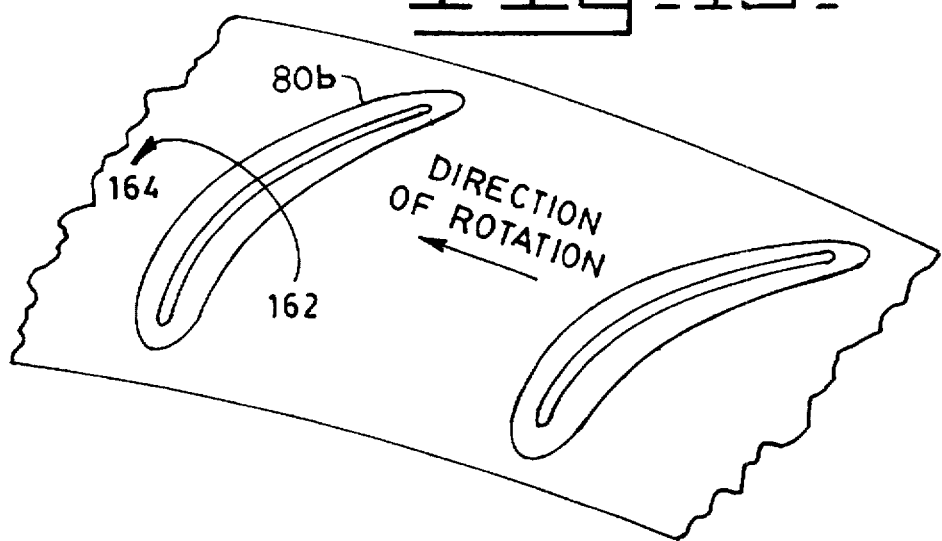

5,752,802

SEALING APPARATUS FOR AIRFOILS OF GAS TURBINE ENGINES

The Government of the United States of America has rights in this invention pursuant to Contract No. DE-AC21-93MC30246 awarded by the U.S. Department of Energy.

TECHNICAL FIELD

The present invention relates generally to gas turbine engines and more specifically to the sealing of airfoil tips with brush seals.

BACKGROUND ART

The efficiency of gas turbine engines depends in part on maintaining close dimensional tolerances during all phases of engine operation. A particularly difficult dimensional tolerance to maintain is that between the tips of airfoils and their opposing structures. In the turbine section of the gas turbine engine, for example, turbine blades lengthen at elevated temperatures resulting in radial growth. During periods of maximum growth, turbine blades may contact their opposing structure resulting in damage to the turbine blades or to their opposing structures.

One method that will prevent contact between the airfoil tips and their opposing structures due to radial is to provide an excessive clearance gap between the airfoil tips and their opposing structures. However, a major drawback of providing such an excessive clearance gap is that significant quantities of gas may leak through such a gap, thereby reducing the efficiency of the gas turbine engine.

Brush seals, as a sealing technology, have been used for many years in the rotating machinery industry for sealing rotating shafts. Brush seals are typically arranged in a continuous ring opposing a conical surface between high and low pressure zones. In construction, the brush seal "bristles" are normally attached to a stationary, low-stressed component while the distal ends of the bristles make sliding contact with a rotating shaft. While airfoil tips also operate between high and low pressure zones and rotate in opposition to a conical surface, in contrast to rotating shafts, airfoil tips are not continuous surfaces. Also, as is know in the industry, rotating airfoil tips are highly-stressed in comparison to the stationary, low-stressed components which normally hold brush seals. As a result, brush seals have not heretofore been considered appropriate for sealing airfoil tips.

Another type of seal utilized for sealing airfoil tips was disclosed in U.S. Pat. No. 4,526,509, issued to C. H. Gay, Jr., et. al. on Jul. 2, 1985 (hereinafter the '509 patent). In the '509 patent, the seal structure was comprised of flexible metallic strips attached to a turbine shroud which provided a seal between the turbine shroud and the blades. While the '509 patent perhaps offered an improvement for turbine blades, it did not address the problem of sealing the tips of other airfoils, such as compressor vanes, nor was the seal of the '509 patent attached to the airfoil tips.

The present invention is directed to overcoming one or more of the problems as set forth above.

DISCLOSURE OF THE INVENTION

In one aspect of the present invention, sealing apparatus for reducing air leakage over the airfoil tips of a gas turbine engine are disclosed. The gas turbine engine has a housing with an annular flow path and a plurality of airfoils disposed within the flow path. Each airfoil has at least one tip disposed in a spaced relationship to an opposing wall surface of the flow path. A clearance gap is thus defined between the airfoil tip and the wall surface. The apparatus includes a brush seal, which is carried on at least one airfoil tip. The brush seal has a plurality of flexible fibers extending from the airfoil tip and has distal ends which sealingly contact the opposing wall surface of the flow path.

In one embodiment of the present invention, a gas turbine engine housing has an outer wall, an inner wall, a plurality of radially extending shaft apertures and a like plurality of radially disposed pivot pockets. The outer wall has a conical inwardly lacing surface and the inner wall has a conical outwardly facing surface spaced radially inwardly from the inwardly facing surface so as to define an annular flow path therebetween. The shaft apertures are disposed through the outer wall and the pivot pockets are located in the outwardly facing surface of the inner wall. Also present is a plurality of variable vanes disposed in the flow path. Each vane has a common axis, an outer tip and an inner tip. The outer tip is disposed in a spaced relationship to the inwardly facing surface of the outer wall and the inner tip is disposed in a spaced relationship to the outwardly facing surface of the inner wall to define a clearance gap between each tip and its respective wall surface. The outer tip has a pivot shaft extending therefrom and the inner tip has a guide pin extending therefrom. The pivot shaft and guide pin are located along a common axis, with the pivot shaft being mounted within the aperture of the outer wall and with the guide pin being mounted within the pivot pocket. The outer tip has an end surface with at least one slot therein, and the inner tip has an end surface with at least one slot therein. Also present is a plurality of brush seals with a brush seal being mounted within each one of the slots of the vanes. Each of the variable vanes has a plurality of monofilament flexible fibers extending from the airfoil tip with the distal ends of the fiber contacting respective opposing wall surfaces to seal a respective clearance gap.

In another embodiment of the present invention, a gas turbine engine has a housing with an outer wall. The outer wall has a conical inwardly facing surface that provides the upper bound to an annular flow path and the housing has affixed thereon a plurality of radially disposed compressor stators, each stator having a tip with an end surface and each surface having an elongated slot therein. Also present is a compressor drum rotatably mounted within the flow path of the housing. The drum is disposed in spaced relationship to the stator tips so as to define a clearance gap therebetween. Also present is a plurality of brush seals. Each brush seal is mounted within a respective one of the slots of the stators. Each seal has a plurality of flexible monofilament fibers extending from the tip end surface of the stator with the distal ends contacting the drum surface to seal the clearance gap.

In another embodiment of the present invention, a gas turbine engine has a housing with an outer wall. The outer wall has a conical inwardly facing surface that provides an annular flow path. Also present is a turbine wheel rotatably mounted within the flow path of the housing. The turbine wheel has a plurality of radially disposed blades, each blade having an outer tip disposed in spaced relationship to the inwardly facing surface of the outer wall so as to define a clearance gap therebetween. Also, each tip has an end surface having an elongated slot therein. Also present is a plurality of brush seals, each of the brush seals being mounted within a respective one of the slots of the blades and each having a plurality of flexible monofilament fibers extending from the tip end surface of the blades with distal ends contacting respective opposing wall surface to seal the respective clearance gap.

In another aspect of the present embodiment, the turbine blades are internally cooled blades having a hollow core with an end wall closing the hollow core and forming the bottom of the elongated slot. A plurality of impingement cooling holes are located in the end wall and connect the hollow core to the slot. The brush seal includes a cap having a "U"-shaped cross-section with opposing side walls and a base. The base has a plurality of cooling air discharge holes therethrough, and the fibers have cooling air discharge holes.

BRIEF DESCRIPTION OF THE DRAWING

FIG. 1 is a diagrammatic side view of a gas turbine engine compressor section.

FIG. 2 is a diagrammatic side view of a variable vane as it typically appears in a close-up view of FIG. 1.

FIG. 3 is a perspective view of a variable vane similar to FIG. 2, with brush seals attached.

FIG. 4 is a close-up view of the variable vane, taken from the upper left portion of FIG. 3.

FIG. 5 is a view of the variable vane embodied in FIG. 4, taken along the line 5—5 on FIG. 4.

FIG. 6 is a perspective view of an airfoil tip with a slot configured therein to receive a brush seal attachment.

FIG. 7 is a perspective view of an airfoil tip with a slot configured therein to receive individual brush seal fibers.

FIG. 8 is a view of the airfoil embodied in FIG. 7, taken along the line 8—8 on FIG. 7.

FIG. 10 is a break-out view of a portion of an internally-cooled turbine blade showing the relative placement of an airfoil tip, several brush seal fibers and a tip cap.

FIG. 11 is a diagrammatic view of the embodiment of FIG. 10 with the various elements in place.

FIG. 12 is a chord-wise diagrammatic view of the embodiment of FIG. 10, showing a cooling air flow path and the relative location of the brush seal relative to an opposing structure.

FIG. 13 is a diagrammatic view of the embodiment of FIG. 11 showing an additional squealer tip element.

FIG. 14 is a diagrammatic top view of a turbine blade tip with lines drawn to illustrate relative operational pressure magnitudes.

FIG. 15 is a diagrammatic top view of a portion of a bladed turbine disk showing the relative motion of the disk and the leakage path of high pressure gas over the tip of the turbine blades.

FIG. 16 is a perspective view of a brush seal tip insert assembly that would typically fit into a turbine blade tip.

FIG. 17 is a view of the embodiment in FIG. 16, taken along the line 17—17 on FIG. 16.

BEST MODE FOR CARRYING OUT THE INVENTION

Figure 9:
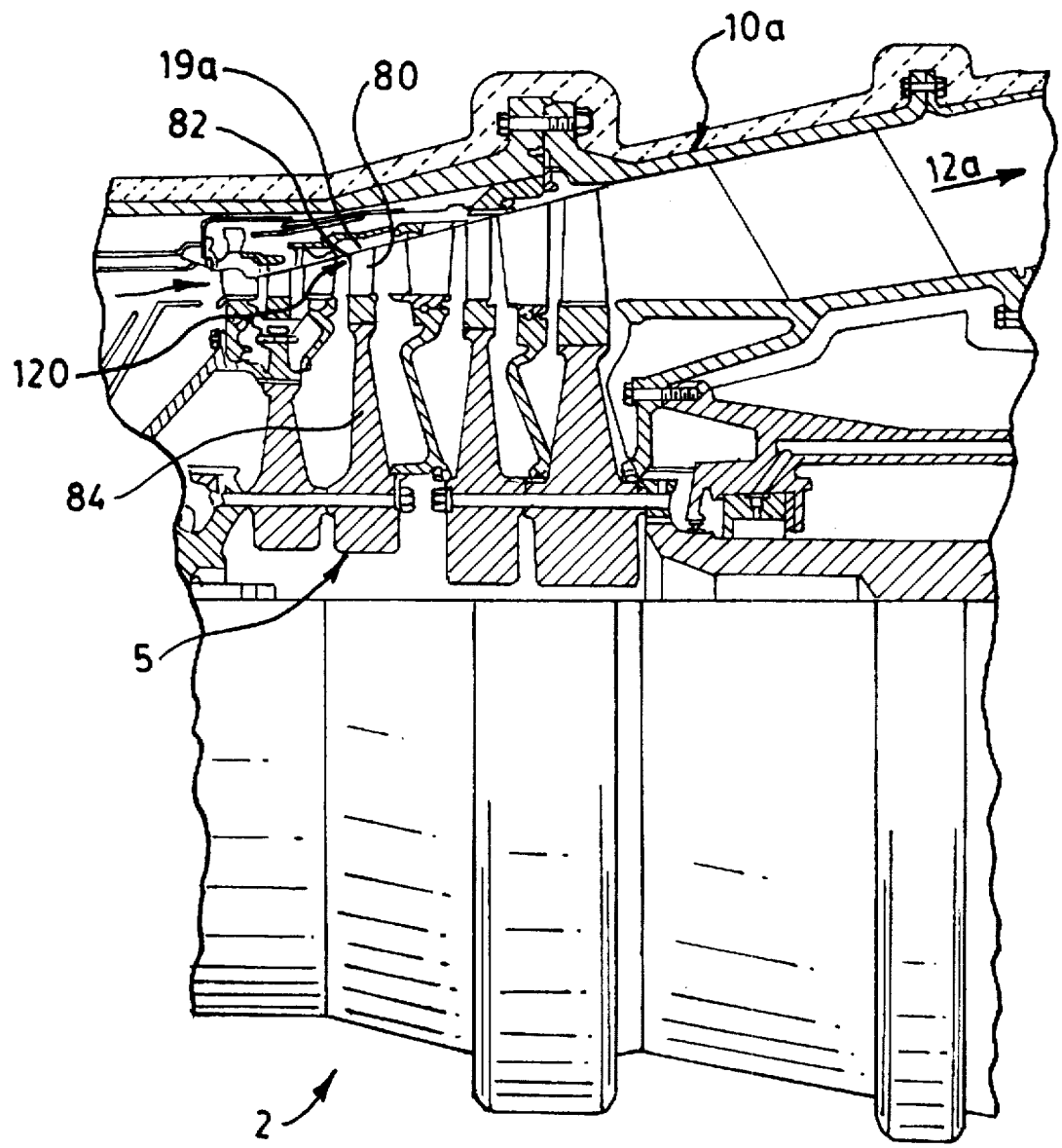
FIG. 9 is a partial diagrammatic side view of a gas turbine engine turbine section.

Referring to FIG. 1, a gas turbine engine 2, not shown in its entirety, has been sectioned to show a housing 10 and a compressor 4. The housing includes an outer wall 19, an inner wall 21 and an annular flow path 12. The compressor section 4 includes a plurality of rotatable blades 8 attached to a longitudinally extending center shaft (compressor drum) 9 which is circumferentially surrounded by the housing 10.

A plurality of compressor variable vanes 14 are positioned within the annular flow path 12, being set before and between rotatable compressor blades 8 within the flow path 12. The variable vanes 14 are each mounted in the flow path 12 by a pivot shaft 30 passing outwardly through a shaft aperture 34 of the housing 10 and by a guide pin 32 located within a pivot pocket 36 in the compressor section 4. A plurality of compressor stator vanes 16 extend from the outer housing 19 and are positioned axially between rotatable compressor blade rows.

Shown further in FIGS. 1 and 2 is an typical variable vane 14 from the compressor section 4 of the engine 2. The vane 14 has an outer tip 26 which opposes outer wall surface 18 of the annular flow path 12. A clearance gap 22 separates the wall surface 18 and the vane tip 26. Likewise, vane 14 had an inner tip 28 which oppose inner wall surface 20 of the annular flow path 12. A clearance gap 24 also separates the wall surface 20 and vane tip 28. Variable vane 14 rotates via pivot shaft 30 and guide pin 32 which are held in position respectively by outer wall 19 and inner wall 21. A turbine variable vane (not shown) is substantially similar in configuration to the compressor vane 14, yet would be located in the turbine section (see FIG. 9).

Shown generally at 6 in FIGS. 3 and 4 are sealing apparatus for reducing air leakage over variable vane tips 26a, 28a. The apparatus 6 includes a brush seal 40 having a plurality of flexible fibers 52 extending from a vane tip 26a. The fibers 52 have distal ends 54 which are sufficiently long to create a seal as they contact, from FIG. 2, an opposing wall surface 18. In a like manner, brush seals 42, 44, 46 on either end 25, 27 of the variable vane 14a have distal ends 54 which are sufficiently long to make sealing contact with an opposing wall 18, 20. The fibers 52 as well as other embodiments hereafter described, are made of a suitable material, such as a flexible metallic (nickel or cobalt alloys) or ceramic monofilament material. Brush seals are similarly applied to turbine variable vanes (not shown).

Shown in FIG. 5 is a cross-section of a variable vane 14a with brush seal fibers 52 inserted in an elongated slot 50 and retained in the slot 50 by a braze joint 51.

Shown generally at 6a in FIG. 6 is sealing apparatus for reducing air leakage over the tips of compressor stators 16. Shown in FIG. 6 is a compressor stator 16 having a tip 60 on which a brush seal 64 is inserted. The seal fibers 70 are mounted in a carrier 66 which is inserted in an elongated slot 62 in the stator tip 60. In both FIGS. 6 and 7, the seal 64 is disposed in a spaced relationship to an opposing annular wall surface 68 (from FIG. 1). The space between the wall surface 68 and the tip 60 defines a clearance gap 69 which is spanned by the brush seal 64, with the distal tips 71 of the fibers 70 making sealing contact with the wall surface 68.

Shown generally at 6b in FIGS. 7 and 8 is the sealing apparatus on a compressor stator 16a. Rather than being in a carrier as in FIG. 6, the fibers 70 of the brush seal 64a are individually mounted in slot 62a in stator tip 60a. A braze joint 72 holds the fibers 70 at the base of the slot 62a.

Referring to FIG. 9, a gas turbine engine 2, not shown in its entirety, has been sectioned to show another area where the sealing apparatus (not shown) of the present invention may be attached. The section shown from the engine 2 includes a housing 10a and a turbine rotor assembly 5. The housing 10a includes an annular flow path 12a and an outer wall 19a such as a turbine nozzle case with tip shoes 82 which oppose the turbine rotor assembly 5. The turbine rotor assembly 5 includes a plurality of rotatable blades 80 attached to a rotor or disk 84 and which is circumferentially surrounded by the housing 10a. Between the inwardly facing wall or tip shoe 82 of the outer wall 19a and the turbine blades 80 is a clearance gap 120.

Referring to FIGS. 10–12, a hollow turbine blade 80 is shown having a tip 90 with an elongated slot 96 therein. Sealing apparatus 6c includes brush seal fibers 100 which are in a U-shaped configuration to conformingly fit near the base or end wall 92 of the slot 96. The taller portion of the fibers 100 extend above the side walls of the slot 96 and past the tip end surface 91 of the blade 80. The distal ends 93 of the fibers 100 sealingly contact their tip shoes 82 to seal the clearance gap 120.

The end wall 92 of the turbine blade 80 has a plurality of impingement cooling holes 94 fluidly connecting the hollow core 110 of the turbine blade 80 with the blade tip 90. The cooling holes 94 pass cooling air from the internal hollow core 110 of the blade 80 out to the fibers 100. A like set of cooling holes 112 in the base of the fibers 100 receive the cooling air passed through the impingement cooling holes 94.

A U-shaped tip cap 102, with opposing sides 104 and a base 106, is located above and contact with the fibers 100. The tip cap 102 compresses the fibers 100 into the elongated slot 96 of the blade tip 90. A plurality of discharge holes 108 located in the base 106 of the tip cap 102 receives cooling air from the discharge holes 112 in the fibers 100 and passes the cooling air into the flow path 12a. The fibers 100 and the cap 102 are also retained in the slot 96 by a braze joint 114 of a metallic braze suitable for the operating temperatures and the composition of the brush seal fibers 100.

In another embodiment, shown in FIG. 13, a cooled turbine blade 80a has an extension 122 attached on the inside surface 96a of one of the side walls 122 of the tip 90a. The extension 122 forms a back-up seal for the tip 90a against its tip shoes 82a, creating a new clearance gap 120a. As described earlier, cooling air passes through a plurality of impingement cooling holes 94a located in the end wall 92a, through cooling holes 112a located in fibers 100a and through discharge cooling holes 108a located in tip cap 102a. The brush seal fibers 100a are now located between the tip cap 102a and the extension 122.

Referring to FIGS. 14–15, a turbine blade top end 150 is shown with imaginary pressure lines 152, 154 included to illustrate the relative pressure magnitudes around a turbine blade 80b in operation. The longer lines 152 correspond to a high pressure zone 162 while the shorter lines 154 correspond to a low pressure zone 164. As with most naturally occurring phenomena, air tends to flow from the high pressure zone 162 to the low pressure zone 164, in this case over the top end 150.

Shown in FIGS. 16–17 is an embodiment of a tip brush seal 130 for use with uncooled turbine blades such as the blade 80b in FIG. 14. The seal 130 includes a U-shaped carrier 134 with a high side 136 and a low side 138. The high side 136 is disposed on, from FIG. 14, the low pressure zone 164 of a turbine blade 80b to more effectively support the individual brush fibers 132 when being pushed from a high pressure zone 162 to a low pressure zone 164. The carrier 134 captures the individual brush fibers 132 by braze attachment 140 and/or by compression. Also, the brush fibers 132 may be inserted directing in a turbine blade tip (not shown) similar to the method shown in for compressor blades in FIGS. 7 and 8.

In operation, the sealing apparatus 6, 6a, 6b, 6c reduce air leakage between the naturally-occurring high and low pressure zones 162, 164 surrounding the tips of airfoils 14, 16, 80 in a gas turbine engine 2, thereby improving engine efficiency. Air leakage is reduced because a brush seal 40, 64, 98, 130, which acts as a barrier, is placed upon the tips of the airfoils 14, 16, 80 to sealingly contact the wall surfaces 18, 68, 82 opposing the airfoil tips.

In operation on compressor variable vanes 14, the sealing apparatus is applied to the vane tips 26, 28 to create a barrier preventing high pressure compressed air from recirculating upstream in the flow path 12. The barrier is placed between the vane tips 26, 28 and the annular inner and outer case walls 20, 18. By preventing such recirculation, the brush seals 40, 42, 44, 46 improve the compressor performance and thereby improve the engine efficiency.

In operation on compressor stators 16, the apparatus is applied to the stator tips 60 where it seals the gap 69 between the tips 60 and the compressor drum surface 68. The method by which engine efficiency is improved here is the same as was previously described with variable vanes 14.

In operation on turbine blades 80, the sealing apparatus is installed on the tips of both cooled and uncooled blades. In the cooled blade application, cooling air is directed through cooling holes 94 in the turbine blade end wall 92, passing through and cooling the brush seal fibers 100 and the blade tip surfaces 90. In the uncooled blade application, brush seal fibers 132 are inserted in the tips of the uncooled blades (not shown) and do not receive cooling air. In both cases, the turbine blades 80 rotate against an opposing walled surface such as a turbine tip shoe 82. While some loss of brush seal fiber material 52, 100, 132 is expected due to the rubbing of these surfaces, low wear, low friction and high lubricity materials such as cobalt and nickel-based alloys should yield significant brush fiber life.

The operation of the invention on gas turbine components of like or similar configuration, such as turbine variable vanes and compressor variable vanes, is readily inferred from the preceding descriptions. Other aspects, objects and advantages of this invention can be obtained from a study of the drawings, the disclosure and the claims.

I claim:

1. In a gas turbine engine, the combination comprising:
   an engine housing having an outer wall, said outer wall having a conical inwardly facing surface providing an annular flow path;
   a turbine wheel rotatable mounted within said flow path of said housing, said turbine wheel having a plurality of radially disposed blades, each blade having an outer tip disposed in spaced relationship to said inwardly facing surface of said outer wall so as to define a clearance gap therebetween, each tip having an end surface having an elongated slot therein, said blades being internally cooled blades having a hollow core with an end wall closing said hollow core and forming a bottom of said elongated slot, a plurality of impingement cooling holes passing through said end wall opening into said elongated slot; and
   a plurality of brush seals, each of said brush seals being mounted within a respective one of said slots of said blades and each having a plurality of flexible monofilament fibers extending from said tip end surface with distal ends contacting respective opposing wall surface to seal the respective clearance gap, and wherein said brush seal includes a cap having a "U"-shaped cross-section with opposing side walls and a base, said base having a plurality of cooling air discharge holes therethrough, and wherein said fibers have cooling air discharge holes.

2. The gas turbine engine of claim 1, wherein said slot has opposing side walls and said fibers of said brush seal are disposed between the side walls of the slot and the side walls of said cap so as to be captured therebetween when the cap is fitted into said slot.

3. The gas turbine engine of claim 1, wherein one of said side walls is longer than the other and extends beyond the tip end surface of the blade to form a backup seal for the tip.

4. The gas turbine engine of claim 1, wherein said fibers and cap are retained in said slot by brazing.

5. In a gas turbine engine, the combination comprising:

an engine housing having an outer wall, said outer wall having a conical inwardly facing surface providing an annular flow path, said housing having affixed thereon a plurality of radially disposed compressor stators, each stator having a tip with an end surface, each surface having an elongated slot therein, each of said stators being internally cooled blades having a hollow core with an end wall closing said hollow core and forming a bottom of said elongated slot, a plurality of impingement cooling holes passing through said end wall opening into said elongated slot;

a compressor drum rotatable mounted within said flow path of said housing, said drum disposed in spaced relationship to said stator tip so as to define a clearance gap therebetween; and a plurality of brush seals, each of said brush seals being mounted within a respective one of said slots of said stators and each having a plurality of flexible monofilament fibers extending from said tip end surface with said distal ends contacting said drum surface to seal said clearance gap, and wherein said brush seal includes a cap having a "U"-shaped cross-section with opposing side walls and a base, said base having a plurality of cooling air discharge holes therethrough, and wherein said fibers have cooling air discharge holes.

6. The gas turbine engine of claim 5, wherein said fibers and cap are retained in said slot by brazing.

7. The gas turbine engine of claim 5, wherein said slot has opposing side walls and said fibers of said brush seal are disposed between the side walls of the slot and the side walls of said cap so as to be captured therebetween when the cap is fitted into said slot.

8. The gas turbine engine of claim 5, wherein one of said side walls is longer than the other and extends beyond the tip end surface of the blade to form a backup seal for the tip.

* * * * *